Oct. 5, 1965        D. L. COLEMAN        3,209,798
SAW WORKPIECE GUIDE
Filed Sept. 11, 1963        2 Sheets-Sheet 1
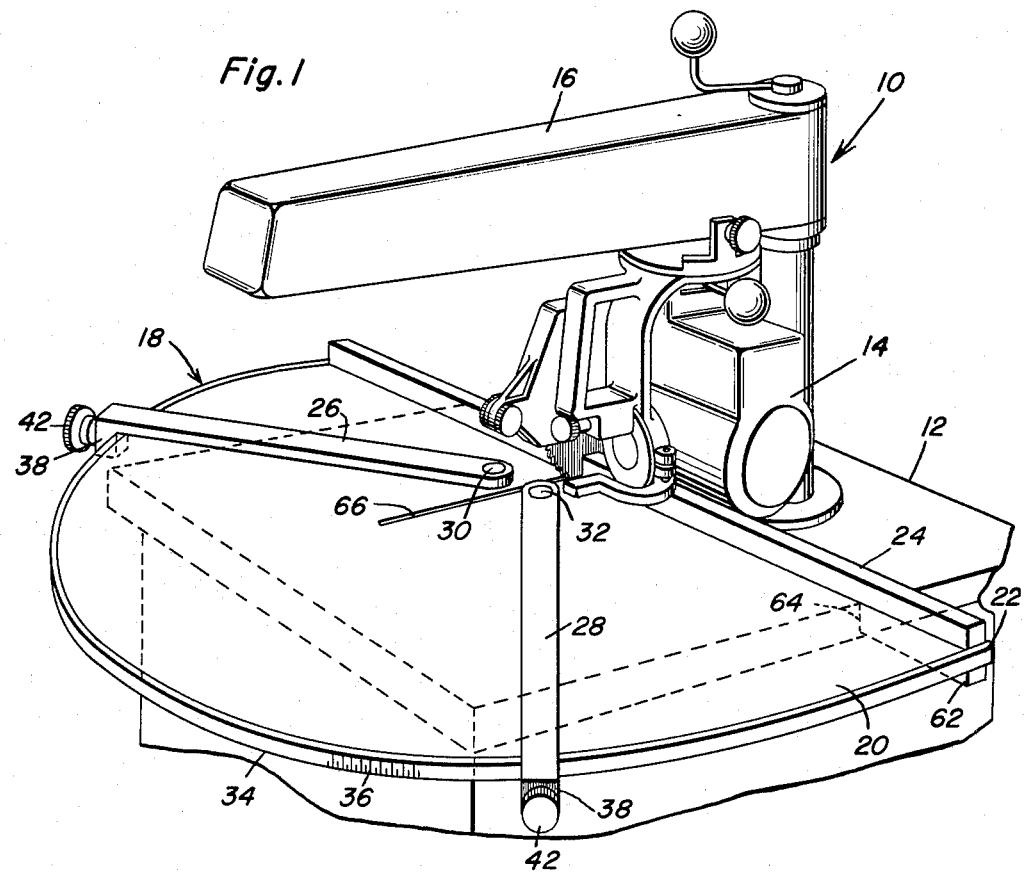
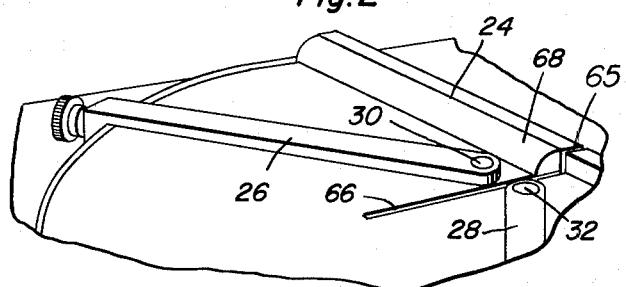
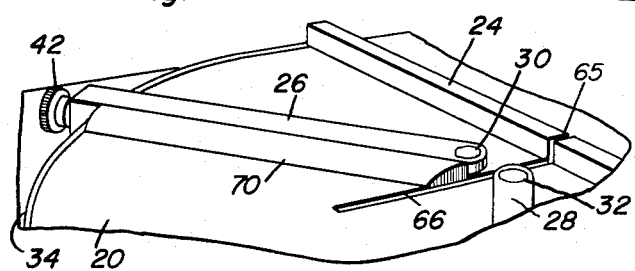
Dewey L. Coleman
INVENTOR.

Oct. 5, 1965  D. L. COLEMAN  3,209,798
SAW WORKPIECE GUIDE
Filed Sept. 11, 1963  2 Sheets-Sheet 2
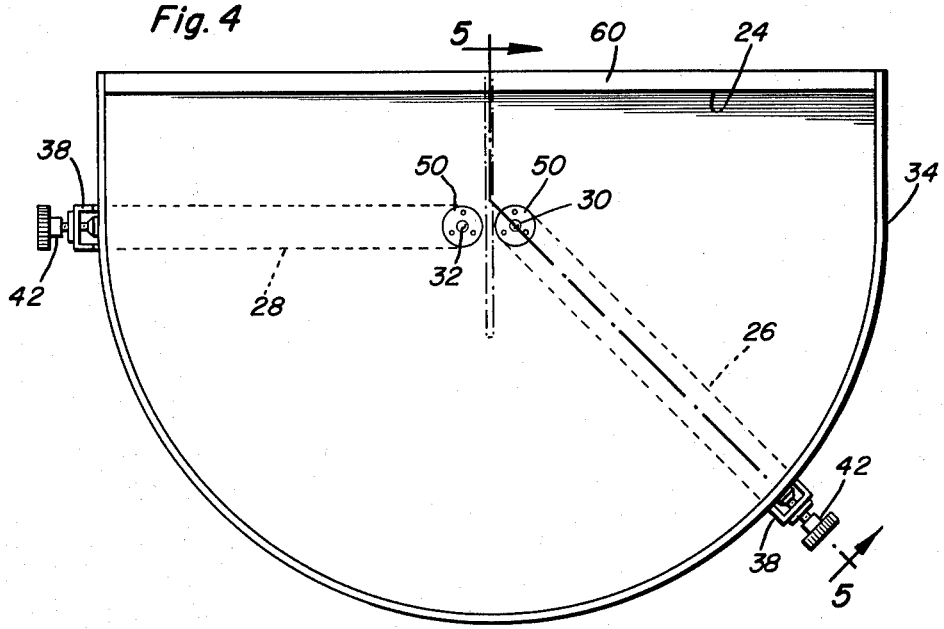
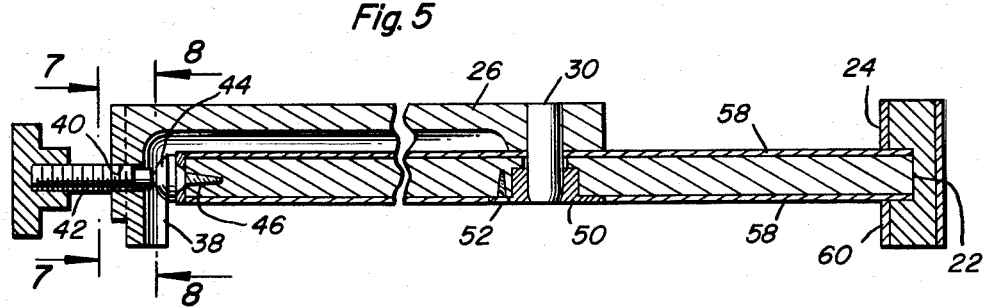
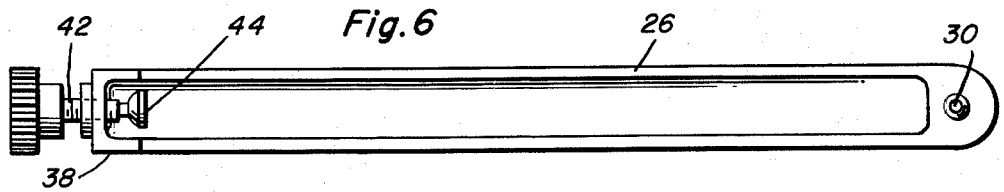
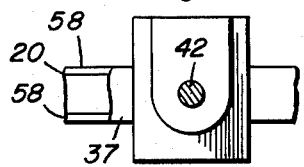
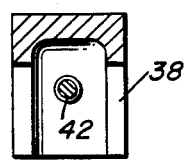
Dewey L. Coleman
INVENTOR.

3,209,798
SAW WORKPIECE GUIDE
Dewey L. Coleman, Scottsbluff, Nebr.
(513 E. Maplewood Drive, Littleton, Colo.)
Filed Sept. 11, 1963, Ser. No. 308,217
4 Claims. (Cl. 143—6)

This invention relates to a saw workpiece guide including means by which extremely accurate miter cuts may be made in a workpiece while utilizing a radial arm power saw.

The saw workpiece guide of the instant invention has as its primary object the provision of a work supporting base plate adapted to rest on the workpiece table of a radial arm saw and including an upstanding workpiece fence and means by which the workpieces to be cut may be accurately positioned relative to the saw blade and its direction of travel so as to form a perfect miter joint.

A further object of this invention, in accordance with the immediately preceding object, is to provide a means whereby one or more workpieces may be accurately cut by means of a radial arm saw along a line disposed at an angle to at least one side of the workpiece.

Another object of this invention is to provide a saw workpiece guide constructed in accordance with the preceding object and including means enabling the guide to be readily adapted for use in conjunction with substantially all types of radial arm saws.

Still another object of this invention is to provide a saw workpiece guide carrying means by which a pair of workpieces may be properly positioned relative to the direction of movement of the radial arm saws so as to assure that the exact annular cut of each workpiece may be very accurately formed as desired.

Still another object of this invention is to provide a saw workpiece guide including means so that the saw workpiece guide may be utilized to cut numerous workpieces at the same time.

A final object of this invention to be specifically enumerated herein is to provide a saw workpiece guide constructed in accordance with the preceding objects which will conform to conventional forms of manufacture, be of simple construction so as to provide a device which will be economically feasible, long lasting and relative trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the guide shown in position mounted upon the support table of a radial arm saw;

FIGURE 2 is a fragmentary perspective view of one portion of the workpiece guide;

FIGURE 3 is a fragmentary perspective view similar to that of FIGURE 2 but shown with a workpiece being supported by one of the pivoted arms of the workpiece guide;

FIGURE 4 is a bottom plan view of the workpiece guide;

FIGURE 5 is an enlarged fragmentary sectional view taken substantially upon the plane indicated by section line 5—5 of FIGURE 4;

FIGURE 6 is a bottom plan view of one of the guide arms of the workpiece guide;

FIGURES 7 and 8 are fragmentary vertical sectional views taken substantially upon the planes indicated by section lines 7—7 and 8—8 of FIGURE 5.

Referring now more specifically to the drawings the numeral 10 generally designates a conventional radial arm circular saw including a support table. The radial arm saw includes a saw assembly 14 mounted for movement longitudinally of the overhead beam 16 and for rotation about mutually perpendicular axes relative to the support beam 16.

The saw workpiece guide of the instant invention is generally referred to by the reference numeral 18 and comprises a base plate 20 including one straight edge portion 22 along which an upstanding fence 24 is secured. The fence 24 also projects below the base plate 20 and it may be seen that a pair of work-engaging arms 26 and 28 are pivotally secured at one pair of corresponding end portions to the base plate 20 by means of pivot pins 30 and 32.

The edge of the base plate 20 remote from the edge portion 22 is generally semi-circular and each half of the semi-circular edge portion comprises an arc having the corresponding pivot pin as its center. Further, a protective metal strip 34 is secured over the generally semi-circular edge portion in any convenient manner and is provided with graduations 36 with which the outer downturned ends 38 of the arms 26 and 28 may be registered. The downturned ends 38 have threaded bores 40 formed therethrough and a pair of thumb screws 42 are also provided and include a universally mounted foot 44. The thumb screws 42 are threadedly engaged in the corresponding bores 40 and the feet 44 adapted to frictionally engage the protective strip 34 which may be conveniently secured to the generally semi-circular edge portion of the base plate 22 by means of suitable fasteners 46, see FIGURE 5.

Each of the pivot pins 30 and 32 projects downwardly through the base plate 22 into an upwardly opening socket 50 in which the lower ends of the pivot pins 30 and 32 are removably rotatably received. The sockets 50 are secured to the undersurface of the base plate 20 in any convenient manner such as by fasteners 52 and the pivot fasteners 30 and 32 swingably mount the arms 26 and 28.

The arms 26 and 28 are generally U-shaped in cross-section between the pivot pins 30 and 32 and the downwardly directed end portions 38. In addition, the downwardly directed end portions 38 are also generally U-shaped in cross-section and open toward the corresponding pivot pin.

The base plate 20 may be conveniently covered by means of a suitable anti-friction and protective covering 58 on both its upper and lower surfaces. In addition, the fence 24 may also be provided with a suitable covering 60.

In operation, the base plate 20 is placed on the table 12. The depending portion or positioning rib 62 of the fence 24 is slidingly received in the channel 64 formed in the table 12 and retains the saw workpiece guide in laterally adjusted position on the table 12. Then, the saw 14 may be operated to form the initial cut 65 in the fence and 66 in the base plate 22. Thereafter, workpieces such as those illustrated in FIGURES 2 and 3 of the drawings and designated by reference numerals 68 and 70, respectively, may have end portions cut at any desired angle.

The workpiece guide may be utilized to accurately cut lumber end portions for making miter joints and it is believed that its versatility in other fields will be readily apparent from the foregoing description.

The thumb screws 42 are of course utilized to maintain the arms 26 and 28 in adjusted rotated positions and the pivot fasteners 30 and 32 are spaced a sufficient distance apart so as to lie on opposite sides of a plane normal to the fence 24 and to enable the circular saw blade of the saw 14 to pass therebetween while moving longitudinally of the support beam 16. Still further, the pivot fasteners 30 and 32 are spaced outwardly from the fence 24 so as to enable workpieces such as that illustrated at 68 to be cut while being properly orientated by means of the fence 24.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a generally horizontally disposed work supporting plate having a saw assembly operatively mounted relative thereto for generally horizontal movement along a path extending transversely of said plate, said plate including an upstanding fence extending transversely of said path of movement of said saw assembly, a saw workpiece guide comprising a pair of work engaging arms pivotally secured to said plate at one pair of corresponding ends for swinging movement across the upper surface of said plate and about spaced axes disposed in an upstanding plane generally paralleling said fence, the pivoted ends of said arms being disposed closely adjacent and on opposite sides of said path and spaced outwardly from the adjacent side of said fence a distance sufficient to enable workpieces on which square end cuts are to be made to be placed between said fence and said one pair of corresponding ends of said arms for cutting by said saw assembly, the sides of said arms facing away from said fence defining work engaging surfaces, means carried by the free end portions of said arms engageable with said plate for retaining said arms in adjusted rotated positions, whereby the work engaging surfaces define unobstructed surfaces.

2. The combination of claim 1 wherein the pivot axes of said arms relative to said work supporting plate are defined by upwardly opening sockets in said plate, said one pair of corresponding ends of said arms including downwardly projecting pivot pins removably and rotatably received in said sockets.

3. The combination of claim 1 wherein the spacing between said fence and said one pair of ends of said arms is greater than the spacing between said axes.

4. The combination of claim 1 wherein the edge portion of said plate on the side of said plane remote from said fence is generally semicircular with each end of said edge portion defining an arc having the corresponding one of said axes as its center, the free end portions of said arms including downturned end portions closely overlying the corresponding halves of said edge portion, said means for retaining said arms in adjusted positions comprising abutment means carried by said downturned end portions adjustably movable generally radially of said axes and engageable with said edge portion.

References Cited by the Examiner

UNITED STATES PATENTS

| | | |
|---|---|---|
| 140,267 | 6/73 | Green. |
| 362,338 | 5/87 | Walker. |
| 2,590,119 | 3/52 | Osterhaus. |
| 2,803,271 | 8/57 | Shaw. |
| 2,812,786 | 11/59 | Hays _____ 143—169 X |

WILLIAM W. DYER, JR., *Primary Examiner.*

DONALD R. SCHRAN, *Examiner.*